United States Patent [19]

Ohtsuki et al.

[11] Patent Number: 4,497,901
[45] Date of Patent: Feb. 5, 1985

[54] FORSTERITE-CARBON REFRACTORY

[75] Inventors: Yuzo Ohtsuki; Nobiru Komatsu, both of Tokai; Akira Watanabe; Gouji Saeki, both of Okayama, all of Japan

[73] Assignees: Nippon Steel Corporation, Tokyo; Kyushu Refractories Co., Ltd., Okayama, both of Japan

[21] Appl. No.: 456,291

[22] Filed: Jan. 6, 1983

[51] Int. Cl.[3] ............................................. C04B 35/56
[52] U.S. Cl. ....................................... 501/90; 501/89; 501/101; 501/112
[58] Field of Search .................... 501/90, 99, 101, 89, 501/112

[56] References Cited

U.S. PATENT DOCUMENTS

| 2,943,008 | 6/1960 | Saunders | 501/90 |
| 3,285,760 | 11/1966 | Hildinger et al. | 501/90 |
| 4,174,970 | 11/1979 | Gelsdorf et al. | 501/90 |

FOREIGN PATENT DOCUMENTS

| 38-17981 | 9/1963 | Japan . | |
| 48-5637 | 1/1973 | Japan . | |
| 49-5407 | 1/1974 | Japan . | |
| 51-95936 | 8/1976 | Japan . | |
| 536147 | 12/1976 | U.S.S.R. | 501/109 |

Primary Examiner—Mark Bell
Attorney, Agent, or Firm—Wenderoth, Lind & Ponack

[57] ABSTRACT

A forsterite-carbon refractory containing forsterite material, carbonaceous material, silicon carbide and magnesia refractory material.

2 Claims, No Drawings

FORSTERITE-CARBON REFRACTORY

BACKGROUND OF INVENTION

The inside wall of a molten metal container, such as molten pig iron vessel, torpedo car, a molten steel ladle, ladle refinery, tundish, etc. has been lined with refractory so as to give it slag resistance.

With the introduction of new processes, such as dephosphorizing, desilicifying or continuous casting, degassing refining, etc., as a result of the recent development of the pig iron and steel producing technology, the lining life of the refractory of the molten metal container, particularly of the part most susceptible to the direct attack by slag, for example, the slag line, charging wall, charging part of the bottom (the part at which molten steel and slag are brought into direct contact), slagging wall, etc., has been reduced.

In the location most susceptible to slag attack of the lining refractory of a molten steel ladle, the temperature is particularly high and the chemical reaction with oxides, such as CaO, $SiO_2$, FeO, MnO, etc. in the slag is conspicuous.

The lining refractory is worn as a result of structural or thermal spalling arising from variation of the crystalline phase of the matrix of the bricks forming the lining due to infiltration of the slag components, the generation of new mineral phases, by the infiltrated components, and unusual expansion and contraction due to repetition of heating and cooling.

The introduction of the afore-described new processes has brought about the elevation of temperature of the molten steel and prolongation of its residence time in the ladle. Thus the location of the lining material most susceptible to slag attack is subjected to a very high temperature not only on its surface but also to a considerable depth.

The slag components, with the viscosity thereof being reduced by high temperature, have greater reactivity to the refractory, such components and reaction products being permitted to infiltrate deep into the interior of the refractory, resulting in structural spalling thereby greatly reducing the lining life of the refractory.

As the lining refractory for use in the location most susceptible to slag attack in the molten steel ladle, a basic refractory, such as dolomite, magnesia, etc., has been used heretofore for its resistance to corrosion by basic slag. However, no satisfactory lining life has been attained due to exfoliation arising from structural or thermal spalling and adhesion of slag or steel to the surface of the refractory.

With a view to obviating said defects of the basic refractory lining applied to the location most susceptible to slag attack, refractory consisting of magnesia, forsterite and silicon carbide has been used (Japanese Laid-Open Publication No.SHO-49-5407). However, no improvement in the corrosion resistance has been obtained since SiC is thermally decomposed into Si and C during use at high temperatures, the generated carbon being very unstable and liable to be oxidized. Thus the characteristics of the basic refractory have not been utilized due to increased melting loss.

Refractory bricks comprising magnesia, silicon carbide and carbon with a metallic material (a steel plate) buried therein were proposed as the ladle lining refractory (Japanese Laid-Open Publication No.SHO-51-95936). Under the oxidizing atmosphere of the molten steel ladle, however, carbon was oxidized and was therefore useless in precluding slag infiltration, no sufficient improvement of the lining life being obtainable due to structural spalling. In addition, since the steel receiving temperature of the molten steel ladle was higher than 1500° C., the metal plate was softened and deformed, the peripheral refractory was weakened, thermal spalling was liable to be generated due to the difference in the thermal characteristics, for example, thermal expansion coefficient, between the metal plate and the refractory, causing exfoliation and resulting in infiltration of slag or steel.

Furthermore, the buried metal plate reduces the compactness of the refractory since it prevents movement of the particles at press-molding, resulting in poor corrosion resistance. Thus the buried metal plate, which is used only as a supplemental means without improving the characteristics of the refractory itself, brings no fundamental solution to the problem of the improvement of the lining life thereof.

SUMMARY OF INVENTION

A series of tests was conducted to obtain a lining refractory for use in the location most susceptible to slag attack in a molten metal container, having sufficient lining life even under severe operational conditions and in an oxidizing atmosphere. This object was to be achieved without the need to prevent the oxidation of carbon contained in the refractory, with effective preclusion of structural spalling without burying a metal plate inside the refractory, and with satisfactory adhesion between the bricks. The inventors have thus arrived at the invention by the use of forsterite-carbon refractory consisting essentially of a mixture of suitable amounts of forsterite, magnesia, carbon and silicon carbide as the lining refractory in the location most susceptible to slag attack in a molten metal container.

DETAILED DESCRIPTION OF INVENTION

The invention provides forsterite-carbon refractory comprising forsterite material in an amount of 5-50 weight %, carbonaceous material in an amount of 5-30 weight %, silicon carbide in an amount of 0.5-10 weight %, the residual part consisting of magnesia refractory material. The invention also provides a molten metal container in which said refractory is used.

The materials constituting the forsterite-carbon refractory particularly useful as the lining of the molten metal container will be described hereinunder.

The forsterite material comprises peridotite, serpentine, talc, synthetic forsterite, etc. Compact layers are formed by the secondary sintering of the refractory while in use through the slight dispersion of $SiO_2$ and $Fe_2O_3$ contained in the forsterite material so as to restrain the oxidation of carbon in the lining refractory.

The suitable amount of the forsterite material is 5-50 weight %, preferably 10-35 weight %. The effect is small if less than 5 weight % of it is used, while the melting loss caused by the slag is increased if greater than 50 weight % is used.

The carbonaceous material has high refractoriness, while exhibiting a marked effect of preventing slag infiltration since it is does not have wettability to slag. The carbonaceous material comprises plumbago, synthetic graphite, petroleum coke, foundry coke, carbon black, etc., plumbago being particularly preferable in respect of its oxidation resistance and high compactness at press-molding.

The suitable amount of carbonaceous material is 5–30 weight %, preferably 10–25 weight %. If below 5 weight %, the effect is small, while if above 30 weight %, the strength and oxidation resistance of the refractory is reduced. If a molten metal container lined with refractory containing too small amount of carbon in the location most susceptible to the slag attack is used under the oxidizing atmosphere, the amount of the residual unoxidized carbon is drastically reduced resulting in a marked decline of the afore-described effect.

Insufficient carbon content, therefore, should be avoided since not only insufficient corrosion resistance is obtained but also structural spalling is generated by the infiltration of the slag. For the prevention of such difficulties, the required carbon amount is 5 weight % at the lowest, preferably more than 10 weight %.

Silicon carbide has the effect of obviating the infiltration of slag, and the adhesion of steel, and lowering the wettability of the refractory. The suitable amount of it is 0.5–10 weight %, preferably 1–5 weight %. If below 0.5 weight %, the effect is reduced, while if above 10 weight %, the increased Si component is liable to produce low melting point reaction products when subjected to slag, resulting in increased melting loss.

The magnesia refractory comprises sintered magnesia clinker, electrofused magnesia clinker, magnesite, etc. The amount of it corresponds to the balance of the composition, i.e. after accounting for the total amount of forsterite, carbonaceous material and silicon carbide.

The carbon in the lining refractory according to the invention, when used in the location most susceptible to slag attack, is highly resistant to slag and heat. Though it is highly effective against corrosion, it becomes fragile when oxidized due to absence of secondary sintering. When combined with forsterite, partial dispersion of $SiO_2$ and $Fe_2O_3$ components in the forsterite material serves to compact the refractory through secondary sintering while in use, thereby inhibiting the oxidation of carbon as well as preventing fragility of the structure even when oxidation proceeds.

By the addition of silicon carbide a bloated film is formed on the surface of the refractory. Since permeability is blocked off by the film, the oxidation resistance is greatly improved together with the dispersion and secondary sintering effect of $SiO_2$ and $Fe_2O_3$ components in the forsterite material.

Magnesia refractory maintains high corrosion resistance of the brick, while the use of suitable amounts together with forsterite, carbonaceous material and silicon carbide enables not only obviating structural spalling without burying a metal plate, but also prevents the oxidation of carbon even in the oxidizing atmosphere. Thus the durability of the molten metal container is improved to a great degree.

In case of bricks produced from magnesia or alumina and carbonaceous material, there is no adhesion between the bricks while hot. When such bricks are used in a molten metal container, they are loosened at the joints thereof resulting in melting loss through the joints and infiltration of slag and steel. Thus the container has to be disassembled early even when there still remains a considerable depth of bricks.

When the forsterite-carbon refractory according to the invention is used as lining refractory of a molten metal container in the location most susceptible to the slag attack, the bricks are rigidly bonded with each other while hot by the action of the forsterite material and silicon carbide (components of $SiO_2$, $Fe_2O_3$, etc. in small amounts) thereby to obviate the oxidation or melting loss through the joints, and infiltration of slag and steel through loosened joints. Thus the molten metal container according to the invention has a very long useful life insofar as the bricks remain.

Pitch or metal powder can be added to the refractory. Pitch, liquefied by heating, covers carbon by infiltrating into the pores of the refractory to prevent oxidation. The suitable amount of pitch is 0.1–5 weight %, preferably 0.5–2 weight %.

Metal powder is softened or melted by heating. After it is infiltrated into minute structural pores of the refractory, it is oxidized. The oxide with its volume expansion fills the minute pores thereby reducing the permeability of the refractory, slag infiltration being thus inhibited.

The useful metal powder comprises Al, Si, etc., the suitable amount being 0.05–5 weight %, preferably 0.5–2 weight %.

When the forsterite-carbon refractory according to the invention is used as lining refractory of a molten metal container in such location as is most susceptible to slag attack, the following effects are obtained.

(1) By adding forsterite to magnesia having corrosion resistance and carbon least reactive to slag, the refractory can be compacted through secondary sintering thereby inhibiting the oxidation of carbon.

(2) By adding silicon carbide to magnesia, carbon and forsterite, a bloated film is formed on the surface of the refractory so as to block off the permeability thereof, to thus further improve the oxidation resistance of the refractory.

(3) By the use of magnesia, carbon, forsterite and silicon carbide in a suitable amount respectively, the corrosion resistance of the basic refractory is maintained, while the lining life thereof is improved through the prevention of slag infiltration. In addition, by causing carbon to exhibit its maximal effect, spalling can be obviated without burying a metal plate in the refractory.

The molten metal container effectively lined with the forsterite-carbon refractory according to the invention over a part or all of the container surface brought into contact with slag, includes a molten pig iron vessel, torpedo car, molten steel ladle, ladle refinery, vacuum degassing furnace, tundish, etc. The lining refractory for use in the location of the molten metal container most susceptible to the slag attack comprises unburnt or burnt bricks produced by kneading and press-molding a mixture of forsterite material, carbonaceous material, silicon carbide, and magnesia refractory material in a suitable amount respectively with a binder, such as sodium silicate, sodium phosphate, phenolic resin, etc.

The invention will be described in more detail with reference to the following examples.

EXAMPLE 1–7

The ingredients as shown in Table 2 comprising the chemical composition as shown in Table 1 were kneaded, press-molded by a friction press and then heat-treated at 300° C. for 12 hours to obtain the samples. Reference samples were produced by using the ingredients of Table 2 in the same manner as in Examples 1 to 7. The physical properties, the results of the slag test and oxidation test of the samples were as shown in Table 2.

The slag test was conducted under the following conditions, which are applicable to the location most susceptible to slag attack in a ladle.

| Test Equipment: | rotary slag tester |
|---|---|
| Test Temperature: | 1650° C. |
| Test Period: | 3 hours |

In addition, the crushing strength of the samples subjected to the oxidation test under said conditions was measured.

TABLE 1

|  | Ig. loss | $SiO_2$ | $Al_2O_3$ | $Fe_2O_3$ | MgO | CaO | C | SiC |
|---|---|---|---|---|---|---|---|---|
| Peridotite | 1.9% | 42.9% | 2.5% | 8.1% | 43.5% | 1.3% | % | % |
| Serpentine | 13.7 | 38.0 | 0.7 | 6.7 | 39.9 | 1.0 | | |
| Magnesia Clinker | | 0.3 | 0.1 | 0.1 | 98.6 | 0.9 | | |
| Plumbago | | 4.2 | 3.7 | | | | 89.2 | |
| Silicon Carbide | | 8.5 | 1.0 | | | | 5.2 | 85.1 |

TABLE 2

| | Example | | | | | | | Reference Sample | | |
|---|---|---|---|---|---|---|---|---|---|---|
| | 1 | 2 | 3 | 4 | 5 | 6 | 7 | 1 | 2 | 3 |
| Ingredient (weight parts) | | | | | | | | | | |
| Peridotite (5~1 mm) | 15 | 15 | 10 | 10 | | | 15 | | | 15 |
| Peridotite (1~0.125 mm) | 10 | 10 | 5 | 5 | | | 10 | | | 10 |
| Peridotite (<0.125 mm) | 5 | 5 | 5 | 5 | | | 5 | | | 5 |
| Serpentine (5~1 mm) | | | | | 10 | 10 | | | | |
| Serpentine (1~0.125 mm) | | | | | 10 | 5 | | | | |
| Serpentine (<0.125 mm) | | | | | 5 | 5 | | | | |
| Magnesia Clinker (5~1 mm) | 35 | 30 | 35 | 30 | 35 | 40 | 30 | 50 | 45 | 35 |
| Magnesia Clinker (1~0.125 mm) | 7 | 12 | 15 | 15 | 12 | 12 | 12 | 25 | 27 | 10 |
| Magnesia Clinker (<0.125 mm) | 15 | 10 | 5 | 5 | 10 | 15 | 10 | 15 | 10 | 15 |
| Plumbago (<1 mm) | 10 | 15 | 20 | 25 | 15 | 10 | 15 | 10 | 3 | |
| Silicon Carbide (<0.125 mm) | 3 | 3 | 5 | 5 | 3 | 3 | 3 | | 15 | 10 |
| Pitch | | | | 1 | 1 | | | | | |
| Aluminum | | | | | | 1 | | | | |
| Sodium silicate | 3 | 3 | 3 | 3 | | | | | | |
| Sodium Phosphate | | | | | 2 | | | | 2 | |
| Phenolic Resin | | | | | | 2.5 | 2.5 | 2.5 | | 2.5 |
| Hexamethylenetetramine | | | | | | 0.3 | 0.3 | 0.3 | | 0.3 |
| Physical Properties Test Result | | | | | | | | | | |
| After Treatment at 300° C. | | | | | | | | | | |
| Apparent Porosity (%) | 9.3 | 8.9 | 8.6 | 8.6 | 9.9 | 4.5 | 4.4 | 4.5 | 8.5 | 4.3 |
| Apparent Specific Gravity | 3.18 | 3.14 | 3.09 | 3.05 | 3.11 | 3.14 | 3.09 | 3.05 | 3.20 | 3.15 |
| Bulk Specific Gravity | 2.88 | 2.86 | 2.82 | 2.79 | 2.80 | 3.00 | 2.95 | 2.91 | 2.93 | 3.01 |
| Crushing Strength ($Kg/cm^2$) | 460 | 430 | 365 | 320 | 405 | 580 | 480 | 560 | 495 | 610 |
| Result of Slag Test | | | | | | | | | | |
| Amount of Melting Loss (mm) | 6.9 | 4.9 | 4.1 | 3.5 | 5.0 | 6.0 | 4.9 | 4.5 | 21.6 | 21.3 |
| Depth of Infiltration (mm) | 1.0 | 1.0 | 1.0 | 1.0 | 1.0 | 1.0 | 1.0 | 1.0 | 4.5 | 3.0 |
| State of Structure | Compact and good | same as Example 1 | same as Example 1 | same as Example 1 | same as Example 1 | same as Example 1 | same as Example 1 | *1 | *2 | *3 |
| Result of Oxidation Test | | | | | | | | | | |
| Oxidation Depth (mm) | 6.5 | 6.0 | 6.0 | 5.5 | 6.0 | 6.5 | 6.5 | 20.0 | 10.1 | 10.0 |
| State of Structure | good | same as left | same as left | same as left | same as left | same as left | same as left | *4 | *5 | *5 |
| Crushing Strength ($Kg/cm^2$) | 264 | 250 | 221 | 210 | 229 | 234 | 241 | 71 | 129 | 134 |

Note:
*1 Sructure was fragile with the back side oxidized.
*2 Melting loss was great with the operation side in the state of secondary sintering, internal cracks being generated.
*3 Melting loss was great with the operation side in the state of secondary sintering.
*4 Decarbonized layer was dilapidated and weakened.
*5 Surface was violently bloated and softened with cracks arising due to inflation.

| Slag Ratio: | converter slag:metallic iron 7:3 |
|---|---|
| Slag Composition: | $SiO_2$ 12.0%, $Al_2O_3$ 3.4%, Total Fe 22.9%, CaO 45.7%, MgO 5.3%, MnO 3.4% |

The oxidation test was made under the following conditions.

| Test Equipment: | silicon carbon exothermic electric furnace (atmospheric) |
|---|---|

The above table shows that the examples of the invention have far smaller melting loss in the slag test compared with that of the reference samples 2 and 3, the slag infiltration depth being reduced, the generation of cracks being nil with high resistance to corrosion and structural spalling.

The oxidation depth in the oxidation test of the examples is greatly reduced compared with that of the reference samples 1–3, while the crushing strength after the oxidation test is greatly increased in evidence of the effect of oxidation resistance of carbon. Thus the refractory according to the invention is superior as a lining refractory a molten metal container for use in the location most susceptible to slag attack.

What is claimed is:

1. Forsterite-carbon refractory which consists essentially of 5–50 weight % forsterite material, 5–30 weight % carbonaceous material, 0.5–10 weight % silicon carbide, and magnesia refractory material.

2. In a container for molten metal which is at least partially lined with a refractory, the improvement wherein said refractory is the forsterite-carbon refractory of claim 1.

* * * * *

UNITED STATES PATENT AND TRADEMARK OFFICE
CERTIFICATE OF CORRECTION

PATENT NO. : 4,497,901

DATED : February 5, 1985

INVENTOR(S) : Yuzo OHTSUKI, Nobiru KOMATSU, Akira WATANABE and Gouji SAEKI

It is certified that error appears in the above-identified patent and that said Letters Patent is hereby corrected as shown below:

In the cover page of the patent, in the space provided for foreign application priority data, insert the following:

--[30] Foreign Application Priority Data

January 13, 1982 [JP] Japan . . . . . . .SHO 57-4387 --.

Signed and Sealed this

Twenty-third Day of July 1985

[SEAL]

Attest:

DONALD J. QUIGG

*Attesting Officer*  *Acting Commissioner of Patents and Trademarks*